United States Patent [19]

Astl

[11] Patent Number: 4,770,585
[45] Date of Patent: Sep. 13, 1988

[54] DEVICE FOR CONNECTING TWO PARTS

[76] Inventor: Franz Astl, A-6345 Kossen 249d, Austria

[21] Appl. No.: 860,786

[22] Filed: May 8, 1986

[30] Foreign Application Priority Data

May 8, 1985 [EP] European Pat. Off. ........ 85105631.7

[51] Int. Cl.⁴ .............................................. F16B 13/00
[52] U.S. Cl. ..................................... 411/446; 403/282; 403/334; 405/251; 411/451; 411/901; 411/914
[58] Field of Search .............. 411/446, 447, 451, 456, 411/477, 900, 901, 914, 82, 83, 508–510, 907; 403/334, 355, 282; 450/250, 251

[56] References Cited

U.S. PATENT DOCUMENTS

| | | | |
|---|---|---|---|
| 1,138,219 | 5/1915 | Hottenroth | 411/57 |
| 1,972,119 | 9/1934 | Wernhardt | 411/456 |
| 1,997,513 | 4/1935 | Escane | 411/15 |
| 2,231,068 | 2/1941 | Harrington | 411/456 |
| 2,251,709 | 8/1941 | Klein | 403/282 X |
| 2,810,145 | 10/1957 | Forrow | 411/900 |
| 3,279,972 | 10/1966 | Thassy | 411/959 X |
| 3,813,985 | 6/1974 | Perkins | 411/914 X |
| 3,921,259 | 11/1975 | Brumlik | 411/446 X |
| 3,964,680 | 6/1976 | Arthur | 411/456 X |
| 4,011,785 | 3/1977 | Schrepferman | 411/900 X |
| 4,050,727 | 9/1977 | Bonnes | 403/344 X |
| 4,280,268 | 7/1981 | Gordon | 403/282 X |
| 4,609,170 | 9/1986 | Schnabl | 411/451 X |

FOREIGN PATENT DOCUMENTS

| | | |
|---|---|---|
| 550196 | 3/1986 | Australia . |
| 34128 | 8/1981 | European Pat. Off. ............ 411/456 |
| 045767 | 2/1982 | European Pat. Off. . |
| 1475082 | 10/1969 | Fed. Rep. of Germany . |
| 1945377 | 4/1970 | Fed. Rep. of Germany . |
| 2058990 | 4/1981 | United Kingdom . |
| 0775431 | 11/1980 | U.S.S.R. ............ 403/355 |

Primary Examiner—Lloyd A. Gall
Attorney, Agent, or Firm—Burns, Doane, Swecker & Mathis

[57] ABSTRACT

A device is provided for connecting two parts, of which one forms a recess and the other a counterpiece which can be pushed into the recess, and, to obtain a simple firm connection without the direction of insertion being fixed, there is on at least one part a coating which consists of granular rigid material and which is attached to a deformable, preferably elastic carrier material. The length of the granular elements is made greater than the distance between the opposing faces of the parts to be connected.

6 Claims, 4 Drawing Sheets

DEVICE FOR CONNECTING TWO PARTS

BACKGROUND OF THE INVENTION

The invention relates to a device for connecting two parts, of which one has a recess, cavity or the like and the other forms a counterpiece which can be pushed into the recess, cavity or the like.

For example, DE-A-1,945,377 makes known a dowel-like cotterpin having, over its periphery, a plurality of teeth which project from the envelope surface radially or inclined towards the head of the cotter pin. The corresponding bore has a smooth wall. The cotter pin is knocked into the bore, and the teeth come up against the wall of the bore and are braced against it under tensile action. In this embodiment, the direction of insertion of the cotter pin is predetermined.

EP-A-45,767 also makes known a device for the releasable connection of two parts, and in this a layer of elastic bristles or the like arranged closely next to one another is formed at least on one part, and the opposing face of the other part in each case is made uneven, preferably likewise being provided with elastic bristles. In this embodiment there is no predetermined direction of insertion, but a connection of this type does not withstand relatively high tensile forces in the releasing direction because of the elastic bristles.

The object on which the invention is based is to design a device of the type described in the introduction, in such a way that a high holding force is obtained, without the direction of insertion being predetermined, and the device can be used in a highly versatile way.

According to the invention, this object is achieved by means of the features in the characterizing clause of claim 1. Because the elements made of rigid material are mounted on a deformable carrier material, when one part is pushed or knocked into a recess or the like in the other part the rigid elements tilt and are then braced relative to the opposing face. Because the rigid elements can execute a tilting movement in any direction, there is no predetermined specific direction of insertion. Moreover, the rigid elements produce a very firm connection which withstands even high tensile forces. Consequently, the device can be used in a very versatile way, and even metal parts can be connected very firmly to one another.

THE DRAWINGS

The invention is explained in detail by way of example, with reference to the drawing in which:

FIG. 9 shows a coated sheet in section.

DETAILED DESCRIPTION OF PREFERRED EMBODIMENTS OF THE INVENTION

Figure 1:
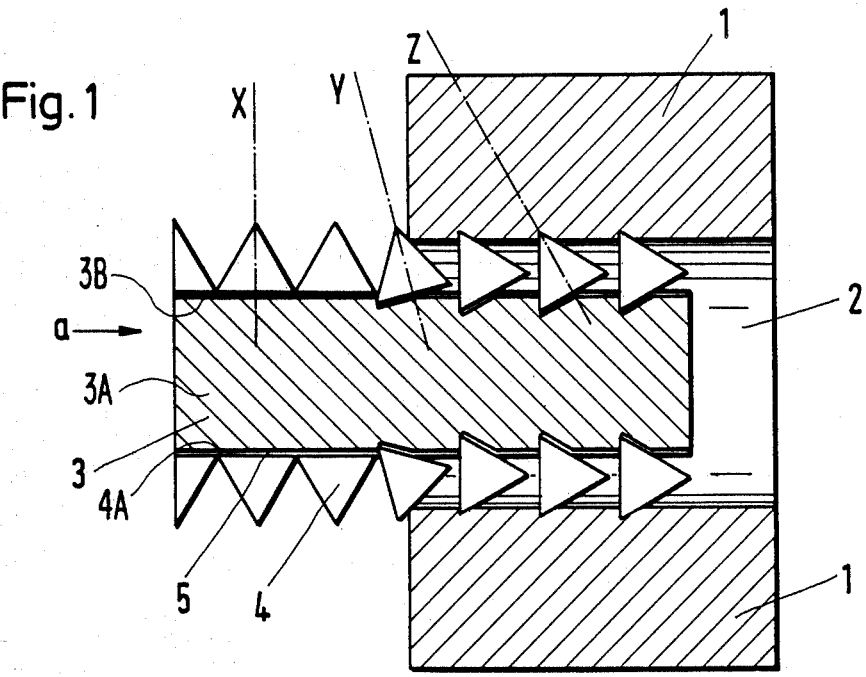
FIG. 1 shows a diagrammatic representation of an insertion part coated with granular material, during insertion into a recess in another part.

The device can be used to connect two parts 1, 3, whenever the two parts 1, 3 have faces which extend parallel to the direction of displacement and which are moved past one another. For example, in FIGS. 1 to 4, the part 1 can have a bore or an elongate gap in the form of a recess 2, whilst the insertion part 3 can be made correspondingly cylindrical or be designed as a plate. The part 3 includes a body 3A having a surface 3B. At least one of the faces located opposite one another is coated with a layer of rigid elements 4 which are represented diagrammatically in the figures as triangular elements. These elements 4 can consist of corrundum, metal or plastic and can have an irregular angular shape. Splinters of various materials can also be attached as elements 4. Also, granules of sand and granular glass can be employed, although they would have an irregular shape rather than that depicted in FIG. 1.

In the embodiment according to FIG. 1, the elements 4 include anchoring portions 4A which are fastened to the insertion part 3 by a carrier material in the form of an adhesive layer 5. The grain size of the elements 4 is selected so that the diameter of the elements 4 is somewhat greater than the intended distance between the opposing faces of the parts 1 and 3. The rigid angular elements 4 are initially aligned relative to the surface of the insertion part 3, as represented in FIG. 1 by a dot-and-dash line X, and this alignment is obtained when the surface is coated with the granular material and it is bonded to the adhesive layer 5. When pushed in in the direction of insertion a, the elements 4 are first tilted slightly, as indicated by the dot-and-dash line Y, since the dimension of the elements 4 is selected larger than the predetermined distance between the opposing faces of the parts 1 and 3. At the same time, the elements 4 are pressed into the material of the part 3. The insertion part 3 can consist of deformable material, such as wood, or of elastic material. When the insertion part 3 penetrates further into the recess 2, the elements 4 are tilted to a greater extent, as indicated by the dot-and-dash line Z, the elements 4 being braced between the opposing faces. If a pull were exerted counter to the direction of insertion a, the elements 4 would necessarily be tilted in the opposite direction, thus ensuring a high holding force of the insertion part 3 in the part 1.

The grain size of the elements 4 is selected according to the pairing of materials. If soft wood or chipboard is used for the part 1, a grain size of, for example, 1 to 2 mm is selected, whereas where hardwood is concerned a grain size of, for example, 0.5 mm is provided. If metal is used for the parts 1, 3, an even smaller grain size can be selected, in conjunction with a correspondingly narrower gap between the opposing faces.

Figure 2:
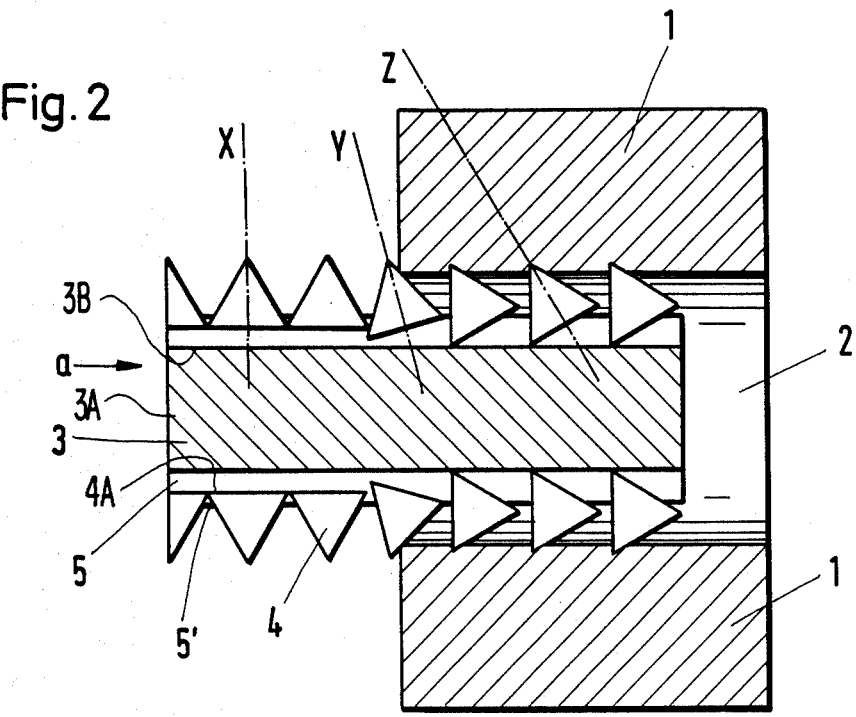
FIG. 2 shows a modified embodiment of the mounting of the granular material.

Whereas, in the embodiment is selected for the insertion part 3, in the embodiment according to FIG. 2 a thicker coating 5 is provided on the insertion part 3 which can consist of a hard material. The thicker adhesive layer 5 is preferably made elastic. This can be a layer of rubber or a layer of elastic plastic. When the insertion part 3 is pressed in the anchoring portions 4A of the elements 4 are pressed into the layer 5 and pressed against the opposing face of the part 1 by the elastic material of this layer 5.

It is also possible to provide an elastic coating of a particular part as a carrier material for the elements 4 and fasten the latter to this elastic layer by bonding, vulcanizing or embedding when the layer 5 is in the molten state. It is possible, furthermore, to further fix the elements 4 attached to an elastic layer 5, by means of a spray adhesive, as indicated at 5' in FIG. 2. By means of this, the connection of the elements 4 can be reinforced and the tilting effect of the elements set. Moreover, it is possible to apply a plastic film in the liquid state to one part, embed the granular or splinter-shaped elements 4 into the still liquid film and then allow the latter to solidify. A thermoplastic material which becomes pliant under the effect of heat can also be provided as a carrier layer for the elements 4. When adhesive is used, a two-component adhesive is preferably provided, to obtain a very firm bond of the elements 4 on the particular part.

Figure 3:
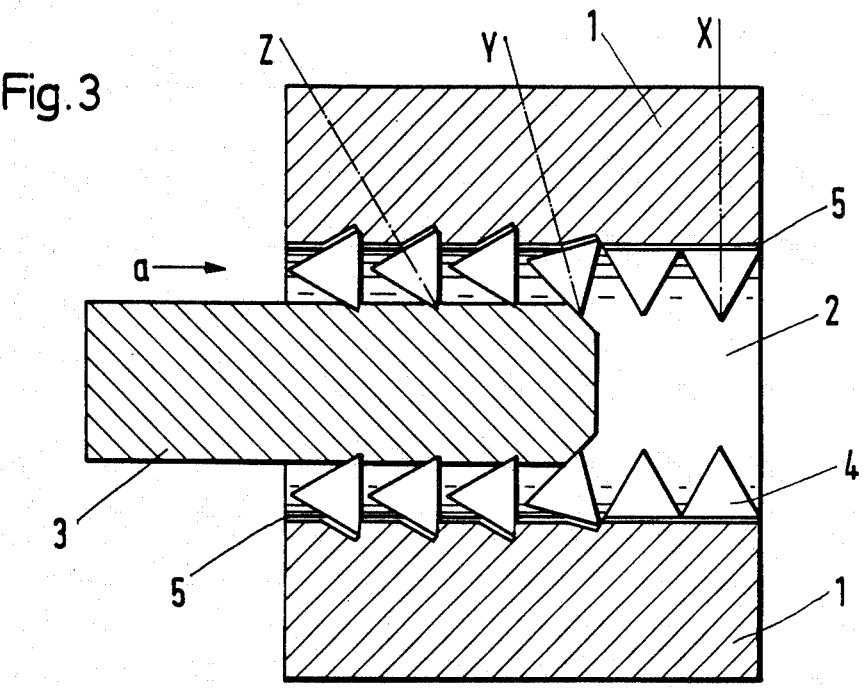
FIGS. 3 and 4 show how the granular material is attached to the inner face of a recess in a way corresponding to that of FIGS. 1 and 2.
Figure 4:
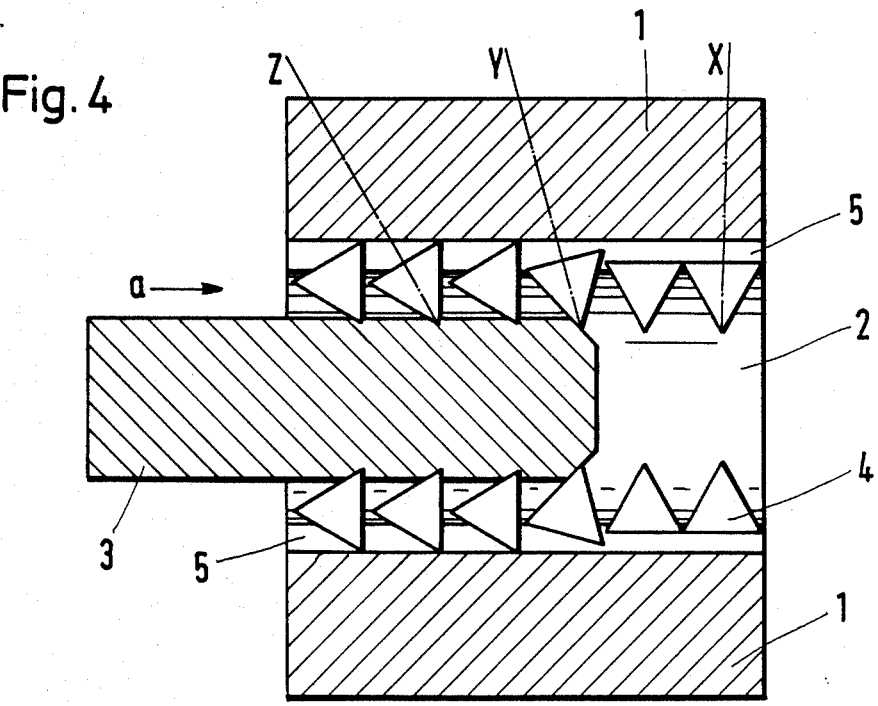

FIG. 3 illustrates an embodiment in which the coating consisting of the elements 4 is attached to the inner faces of a recess 2 by means of an adhesive layer 5. In this case, the part 1 consists of deformable material. Otherwise, this arrangement corresponds to that shown in FIG. 1. The embodiment according to FIG. 4 corresponds to that according to FIG. 2, the elastic layer 5 being attached to the inner walls of the recess 2 and not to the insertion part 3.

Figure 5:
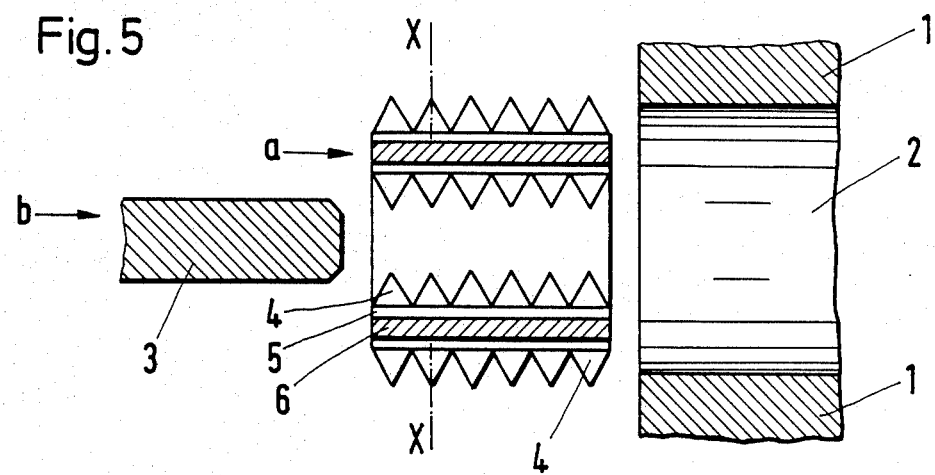
FIGS. 5 and 6 show the coating of a sleeve with granular material for connecting two workpieces.
Figure 6:
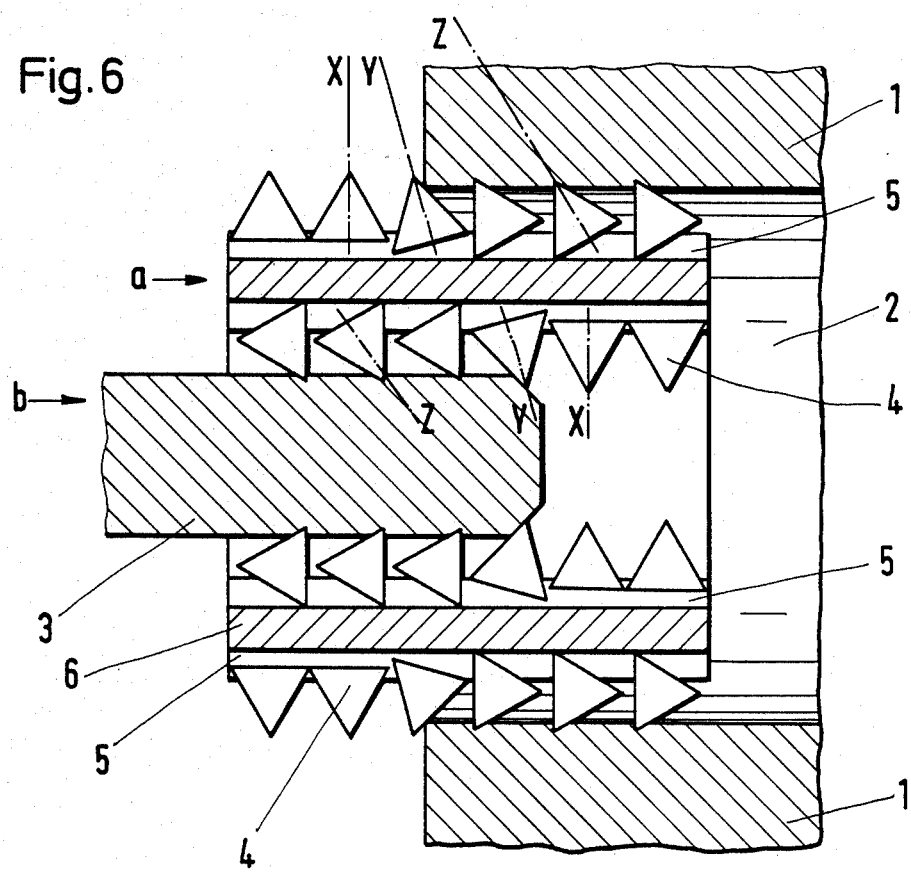

FIGS. 5 and 6 show a sleeve 6 which is coated with the elements 4 on its inner and outer periphery, and in this exemplary embodiment an elastic layer 5 similar to that of the embodiment according to FIG. 2 is provided on the inner and outer faces. Here, according to FIG. 5, the sleeve is first pressed into the recess 2 in the direction of insertion a, whereupon the insertion part 3 is pressed in in the direction of insertion b.

Figure 7:
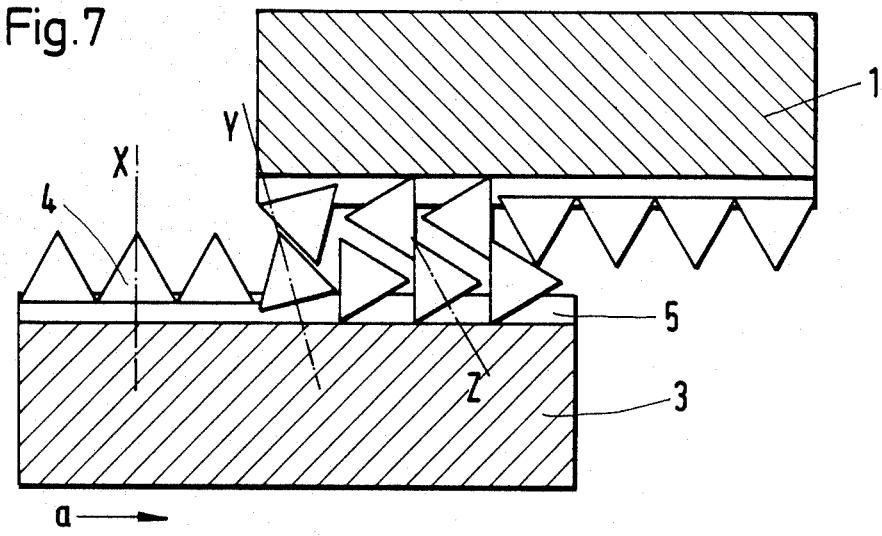
FIGS. 7 and 9 show an arrangement with the faces located opposite one another being coated, during the insertion of the elements and after their partial engagement.
Figure 8:
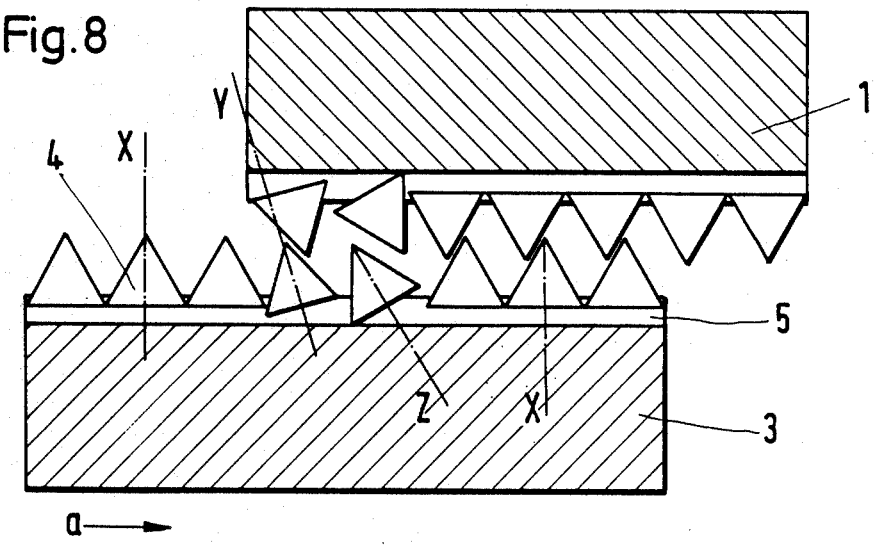

FIGS. 7 and 8 illustrates the tilting action on the elements 4 of a coating on the two opposing faces. When pushed in according to FIG. 7, the individual elements 4 tilt in the way already described, whereupon, after insertion, the individual elements spring back and mesh with those opposite as indicated in FIG. 8 at the axis X located on the right and represented by a dot-and-dash line. When the carrier layer 5 is elastic, the arrangement shown in FIG. 8 tends to occur after insertion, whereas when the carrier layer 5 consists of a deformable material the arrangement illustrated in FIG. 7 tends to occur after insertion.

Figure 9:
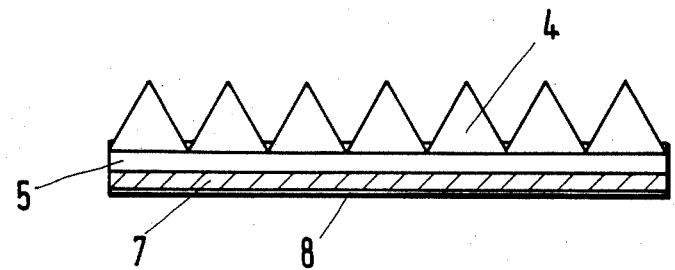

FIG. 9 shows a sheet 7 of metal, plastic, rubber or the like, coated on one side with a carrier layer 5 which can consist of adhesive, plastic, rubber or the like, on which the splinter-shaped or angular granular elements 4 are glued, vulcanized or embedded. On the opposite side, the sheet 7 is provided with an adhesive layer 8, by means of which the sheet can be fastened to the surface of any part.

The parts to be connected to one another can have many different shapes. Thus, for example, they can be profiles which are connected to one another by means of an intermediate piece similar to the insertion part 3 in FIGS. 1 and 2. The recess 2 can be designed as a bore, a groove or a profile cavity. The insertion part 3 can be designed as a dowel, tenon, tongue, flat piece or profile, depending on the sector of use of the connection device. The connection device can be used in a highly versatile way, for example in completion work on furniture or interiors for fastening constructional parts instead of with rivets or nails, for connecting components in machine-building instead of with grooved pins, and the like.

The holding force of the connection device can be varied by adjusting the elasticity of the carrier layer 5. Thus, for example, a material similar to hard rubber or a soft-elastic material can be used.

The splinter-shaped or angular granular elements 4 can also consist of short fragments of hard plastic fibers, such as nylon or the like. For a specific intended use, a coating consisting of elements 4 of substantially the same size is provided, so that essentially all the elements on a unit of surface engage with the opposing face. At the same time, the elements 4 can be attached to the carrier layer 5 in such a way that they are close next to one another or are at a certain distance from one another. This too ensures that the holding force of the connection device can be adjusted.

A further possibility of adjusting the holding force of the connection device is provided by making the distance between the opposing faces of the parts to be connected in proportion to the height of the elements 4 projecting on one face or on both faces. If the distance in only slightly less than the height of the projecting elements 4, a lower holding force is obtained than in an embodiment with a comparatively shorter distance. This design is independent of the choice of grain size of the elements 4 according to the pairing of the materials of the parts to be connected.

It is possible, furthermore, to vary the thickness of the carrier layer 5. If an elastic carrier layer 5 is used, this can have a thickness which corresponds approximately to the average diameter of the elements 4. Depending on the use of the material located under the carrier layer 5, the carrier layer 5 can even be made thinner, for example if a deformable material is located under it. The elements 4 can also be embedded directly in the surface of, for example, a plastic part, so that there is no need for a separate carrier layer or adhesive layer 5.

The elements 4 themselves usually have an irregular shape, and they can be more or less sharp-edged, depending on the desired depth of penetration and bracing. The holding force can also be influenced by this means. For example, if the elements 4 have an almost spherical shape, a relatively low holding force is obtained because the elements can easily spring back in the opposite direction and can slide on the opposing face more easily than sharp-edged elements.

The device is conventionally intended for the permanent connection of parts, but, as described above, a connection which is releasable for specific purposes is also possible, depending on the setting of the holding force.

The face of the carrier material, on which the coating consisting of elements 4 is attached, is preferably smooth, as is also the engaging face of the other part located opposite the elements 4. However, it is also possible to make this engaging face uneven, such as is the case, for example, on the inner wall of a bore in a piece of chipboard. In this case, a larger grain diameter is provided for the elements 4. Coating with elements 4 can also be provided only partially on one of the faces to be connected, for example in the form of strips which extend in the direction of insertion.

I claim:

1. First and second parts adapted to be secured together, at least one of said parts being movable relative to the other to a secured position therewith, a space disposed between said parts in a direction perpendicular to the direction of movement, said second part including a body with a surface facing said first part, separate rigid sharp-edged granules each including an anchoring portion, and an elastic carrier material adhesively securing said anchoring portions to said surface, said granules protruding outwardly from said carrier material in a direction substantially perpendicularly to said direction of movement by a distance greater than said space so as to contact said first part when said parts are brought to said secured position, said anchoring portions being elastically supported by said carrier material so as to be elastically movable in a direction away from said first part upon said granules contacting said first part in response to said relative movement between said parts, whereupon separation of said first and second parts is prevented by the engagement of said granules and said first part solely under the biasing action of said carrier material.

2. Apparatus according to claim 1, wherein said second part is solid.

3. First and second parts to be non-releasably secured together, at least one of said parts being movable relative to the other to a secured position therewith, said first part including a recess with a substantially smooth wall, said second part including a body with an elastic outer portion facing said wall, a space disposed between said wall and said outer portion in a direction perpendicular to the direction of said movement, separate rigid sharp-edged granules each including an anchoring portion carried by said elastic outer portion, said granules protruding outwardly from said outer portion in a direction substantially perpendicularly to said direction of movement by a distance greater than said space so as to contact said wall when said parts are brought to said secured position, said anchoring portions being elastically supported by said outer portion so as to be elastically movable in a direction away from said wall upon said granules contacting said first part in response to said relative movement between said parts, whereupon separation of said first and second parts is prevented by the engagement of said granules and said wall under the biasing action of said elastic outer portion to create a non-releasable connection of said parts.

4. Apparatus according to claim 3, wherein said granules comprise one of glass, metal and plastic.

5. Apparatus according to claim 3, wherein said carrier material comprises a sheet attachable to said first part.

6. Apparatus according to claim 3, wherein said second part comprises a solid part.

* * * * *